(No Model.)
S. T. COMPTON.
HARVESTER PLATFORM AND CARRIER.
No. 546,415. Patented Sept. 17, 1895.
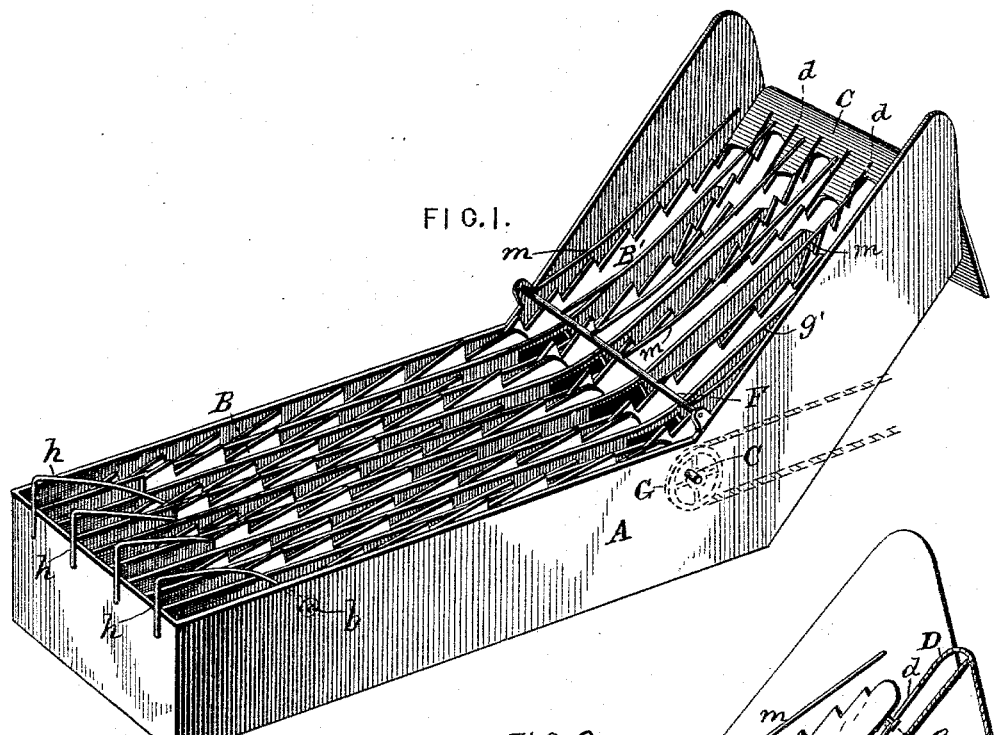
FIG. 1.
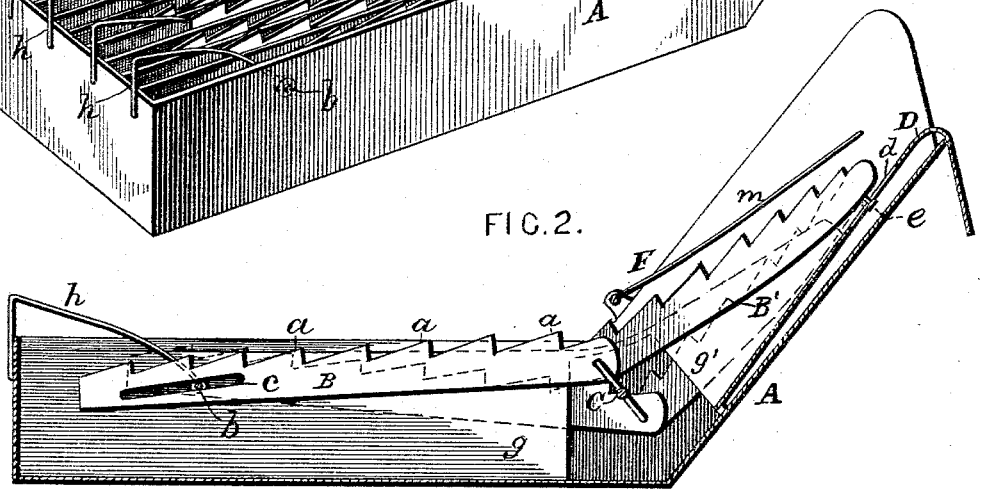
FIG. 2.
FIG. 3.
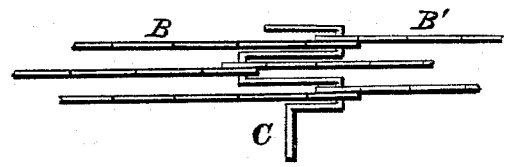
WITNESSES:
William C. Shelley
H. A. Daniels
INVENTOR:
Silas T. Compton
By Shelley & Martin
Attorneys

UNITED STATES PATENT OFFICE.

SILAS T. COMPTON, OF TROY, TEXAS.

HARVESTER-PLATFORM AND CARRIER.

SPECIFICATION forming part of Letters Patent No. 546,415, dated September 17, 1895.

Application filed November 6, 1894. Serial No. 527,972. (No model.)

*To all whom it may concern:*

Be it known that I, SILAS T. COMPTON, a citizen of the United States, residing at Troy, in the county of Bell and State of Texas, have invented certain new and useful Improvements in Harvester-Platforms and Carriers; and I do hereby declare the following to be a full, clear, and exact description of the invention, such as will enable others skilled in the art to which it appertains to make and use the same.

This invention relates to harvester-platforms which are provided with carriers for carrying forward and elevating the grain; and it consists in certain improvements in such devices, as hereinafter described and claimed.

In the accompanying drawings, Figure 1 represents a plan view of a harvester-platform and carrier provided with my improvements. Fig. 2 is a longitudinal vertical section of the same. Fig. 3 illustrates the crank-shaft.

A designates the frame of the harvester-platform, the stubbleward portion of which is inclined upward, as shown. Within the main or horizontal portion of the frame A are loosely secured the parallel bars B, which form the main part of the grain-carrier, said bars being provided with teeth $a$, which are constructed to catch and push stubbleward the grain thrown upon the platform during operation. Each of the toothed bars B is connected at its stubbleward end with a crank-shaft C, mounted in and extending across the frame A, and at its grainward end each of said bars B is loosely connected with a fixed crossing rod $b$, the said rod being passed through a slot $c$ in each of said bars to allow the operating movement of the bars. An elevating-carrier is located in the stubbleward inclined portion of the frame for the purpose of carrying the grain up to the binding mechanism, and consists of a series of parallel bars B', provided with teeth and somewhat similar in construction to the bars B.

The bars B' are connected at their lower ends with the crank-shaft C, and at their upper ends said bars are connected loosely with a slotted inclined plate D, against which said bars move during operation. The loose connection $e$ of each bar B' in a slot $d$ is adapted to retain the bar in position and allow its longitudinal movement.

$g$ indicates a series of thin bars or plates which are fixed in position between the carrier-bars B, and similar plates $g'$ are fixed between the bars B', the plates of both series being connected, as seen at $i$, and serving to prevent the grain falling down between the carrier-bars. At or near their grainward ends the bars B are each provided with a slot $c$, through which the rod $b$ is passed, said slot being inclined, as shown, so that the bars B on their forward movement are raised to catch the grain and are brought downward somewhat on their backward movement.

F indicates a guide for the grain as it is carried up by the elevating-carrier bars B', said guide being formed of a series of rods $m$, which extend from a crossing rod or bar which is pivotally mounted on the frame, said rods $m$ being in position to rest on the grain as it is carried up, and thus prevent it falling backward.

Guards $h$, formed of bent rods, are fixed in position at the rear end of the frame to prevent backward movement of grain on the platform. A sprocket-wheel G is mounted on the crank-shaft C for connecting said shaft with driving mechanism.

I claim—

1. In a harvester platform, the combination with a frame, of a carrier formed of two series of toothed bars, a crank-shaft with which both series of bars are connected, the bars of one series being slotted and loosely connected with a fixed cross-rod so as to allow their longitudinal movements, a slotted, inclined plate, with which bars of the other series are loosely connected, and a cross-bar, pivotally mounted and having a series of rods extending therefrom, in position to rest on the grain when the latter is being elevated, substantially as and for the purposes described.

2. The combination, with a harvester platform, a portion of which is inclined and slotted as shown, of a grain carrier provided with two series of toothed bars, B, B', the bars, B, being provided with inclined slots c, and bars B', being loosely connected at their upper ends with the inclined, slotted portion of said platform, a fixed, cross-rod extending through the inclined slots c, in bars B, and a rotative shaft provided with cranks, one bar, B, and a bar, B', being connected with each of said cranks, substantially as described and shown.

In testimony whereof I have affixed my signature in presence of two witnesses.

SILAS T. COMPTON.

Witnesses:
J. W. METSON,
J. W. CANN.